United States Patent [19]

Bron

[11] 4,241,757
[45] Dec. 30, 1980

[54] FLOW REGULATOR

[76] Inventor: Dan Bron, 36 Palmach St., Haifa, Israel

[21] Appl. No.: 24,173

[22] Filed: Mar. 26, 1979

Related U.S. Application Data

[63] Continuation-in-part of Ser. No. 811,150, Jun. 28, 1977, abandoned.

[51] Int. Cl.³ .............................................. G05D 7/01
[52] U.S. Cl. .................................................... 137/501
[58] Field of Search ............................... 137/501, 504

[56] References Cited

U.S. PATENT DOCUMENTS

| | | | |
|---|---|---|---|
| 1,468,434 | 9/1923 | Zander | 137/504 |
| 2,149,673 | 3/1939 | Godfrey | 137/504 X |
| 2,807,144 | 9/1957 | St. Clair | 137/501 X |
| 2,950,733 | 8/1960 | Perkins | 137/501 X |
| 3,024,803 | 3/1962 | Beremand | 137/501 |
| 3,172,254 | 3/1965 | Wright | 137/501 X |
| 3,886,968 | 6/1975 | Murrell | 137/501 |

FOREIGN PATENT DOCUMENTS

| | | | |
|---|---|---|---|
| 464273 | 1/1974 | Australia. | |
| 26615 | of 1912 | United Kingdom | 137/501 |

*Primary Examiner*—Robert G. Nilson
*Attorney, Agent, or Firm*—Lane, Aitken, Ziems, Kice & Kananen

[57] ABSTRACT

There is provided a fluid flow control unit adapted to be connected to a source of fluid under pressure. The unit comprises a housing having an input port and an output port and a body suspended in said housing by means of a diaphragm dividing said housing into an input chamber and an output chamber wherein said body is movable in relation to said ports under the influence of the fluid pressure differential between said input chamber and said output chamber for variably restricting said output port under the displacement of said body toward said output port. There is further provided resilient means for biasing said body toward said input port and at least one passageway formed in said body and passing therethrough for fluid communication between said input and output chambers via said body, the dimensions of which passageway remain unchanged during operation. The result of said arrangement is that the flow of fluid through said output port is controlled at a constant rate by said movable body and resilient means despite variations in the fluid pressure at, at least, one of the ports.

5 Claims, 4 Drawing Figures

FLOW REGULATOR

This application is a continuation-in-part of prior application Ser. No. 811,150, filed June 28, 1977, now abandoned.

The present invention relates to a fluid flow regulator or control unit and more particularly to a fluid flow control unit adapted to be connected to a source of fluid at a controlled constant rate despite variations in the fluid pressure at the source.

The control unit of the invention is especially suitable for providing small fluid flows from a source of a relatively high pressure.

Various types of flow regulators are known in the art. In one known type, the output flow is regulated by means of resilient members having openings through which liquid passes. The flow through said openings is regulated by the liquid pressure on the resilient members which deforms said openings in accordance with the applied liquid pressure and consequently said pressure regulates the size of said openings and the liquid flow therethrough. In another type of flow regulators, the output flow is regulated merely by the regulation of the input pressures in consideration of the consumer's needs. These two methods of flow regulation are inexact when used for wide ranges of pressures and therefore are more suitable for large discharge flows. In still another type of flow regulators, e.g., in the regulators disclosed in U.S. Pat. Nos. 780.986, 2.041.198 and 3.918.481, the output flow is regulated by means of a valve member which is slidable in a casing. The valve member is fitted with a tapered needle or a stem which cooperates with a restricted valve seat to thereby regulate the output flow. The major disadvantages of this type of flow regulators is the fact that the valve member or at least a portion thereof is constantly in frictional sliding engagement with the inner wall of the casing which friction detracts from the sensitivity of the device especially when small fluid flows are involved and, moreover, very often the valve member becomes stuck inside the casing due to particles which are carried along by the fluid and are incapable of passing through the very restricted gap between the outer surface of the valve member and the inner surface of the casing. Also, as it is known, the liquid, i.e., usually water, which passes through the regulators tends to buildup a layer of fur on the surfaces through which it flows, and, thus, the initially very small gap which prevails between the movable valve member and the inner surface of the casing, becomes covered with fur which frictionally hampers the critical smooth sliding movement of the valve member.

It is, therefore, the broad object of the present invention to provide a simple and inexpensive fluid flow control unit adapted to overcome the above disadvantages and to accurately control a wide range of input fluid pressures and output flows.

This object is achieved in the flow control unit of the invention by controlling the pressure differential which is created in the unit and which is relatively small in comparison with the pressure of the fluid source. Only after obtaining said relatively small pressure differential, the fluid flow is regulated so as to provide a constant fluid output flow despite variations of the input pressure or a pressure change at the consumer end.

More specifically, according to the invention, there is provided a fluid flow control unit adapted to be connected to a source of fluid under pressure, said unit comprising:

a housing having an input port and an output port;

a body suspended in said housing by means of a diaphragm movable in relation to said ports under the influence of the fluid pressure differential between the input port and the output port for variably restricting said output port upon the displacement of said body toward said output port;

at least one passageway formed in said body and passing therethrough for fluid communication between said input and output ports via said body, the dimensions of which passageway remain unchanged during operations; and resilient means for biasing said body toward said input port;

whereby the flow of fluid through said output port is controlled at a constant rate by said movable body and resilient means despite variations in the fluid pressure at, at least, one of the ports.

While the invention will now be described in connection with certain preferred embodiments with reference to the following illustrative figures, so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the devices and their constituent parts in more detail than is necessary for a fundamental understanding of the invention, the description taken with the drawings making apparent to those skilled in the art how the several forms of the invention may be embodied in practice.

Figure 1:
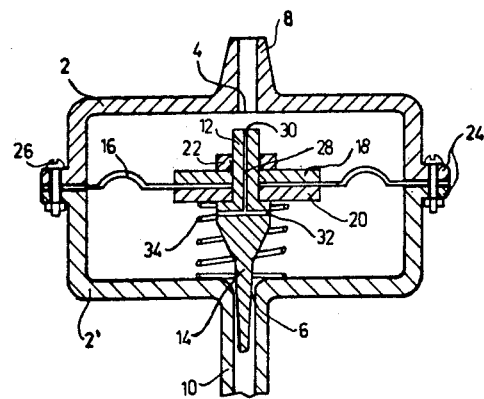
FIG. 1 is a cross-sectional view of a flow control unit in accordance with the invention.

In FIG. 1 there is shown a cross-sectional view of a flow control unit comprising a two-part housing 2 and 2' having an input port 4 and an output port 6 and optionally, conduit sections 8 and 10 extending, respectively, from said input and output ports. Inside the housing, there is suspended a movable body 12 having a tapered stem portion 14 adapted to cooperate with the output port 6 to restrict the fluid flow therethrough. As seen in the figure, the body 12 is affixed to a diaphragm 16 by means of two center-plates 18 and 20 clamped on the two surfaces of the diaphragm and is secured in this position by means of a nut 22. The peripheral edge of the diaphragm 16 is clamped between the flanges 24 of the two housing parts 2 and 2' and upon the set of screws 26 being tightened, constitutes a pressure-tight seal between the housing parts.

The diaphragm 16 divides the interior of the housing into two chambers one chamber is directly associated with the input port 4 and the other chamber with the output port 6. The fluid in the housing communicates between the two ports via a passageway 28 extending within the body 12 between non-linearly aligned inlet and outlet openings 30 and 32. A spring 34 is positioned inside the housing between the housing part 2' and the centerplate 20 for assisting the resilient diaphragm in biasing the body 12 towards the input port 4.

In operation, fluid under pressure is entering the input port 4 and flows via the passageway 28 to the output port 6 to be discharged through the conduit 10. As long as the fluid flow is smaller than a predetermined desired value, the spring 20 will bias the movable body 12 upwards and the output port will remain relatively unrestricted. The spring is adapted to provide said bias as the fluid pressure on both sides of the diaphragm is equal since the surface areas on the two opposite sides of said diaphragm are designed to be equal and thus the fluid pressures on said diaphragm are balanced. As the fluid flow increases and approaches said predetermined desired value, there is formed a pressure differential between the input and output ports which pressure differential is equal to the pressure loss of the fluid flow when passing through the passageway. This pressure differential will cause the body 12 to move toward the output port against the action of the spring and govern the fluid flow controlling point. Thus, by choosing a spring of a prespecified biasing strength, an output flow of a predetermined value, can be obtained. Furthermore, as the output flow of the control unit is not dependent on pressure in the output or consumer line, said unit is not influenced by variations in the parameters and provides an output flow at a constant rate.

Figure 2:
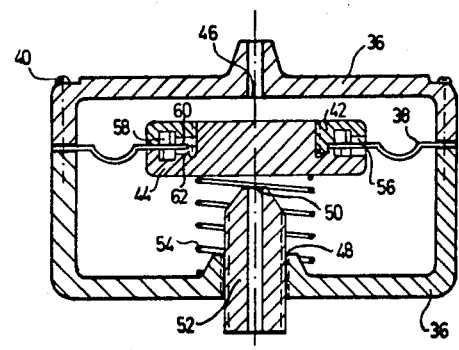
FIG. 2 is a cross-sectional view of a different embodiment of a flow control unit.
Figure 4:
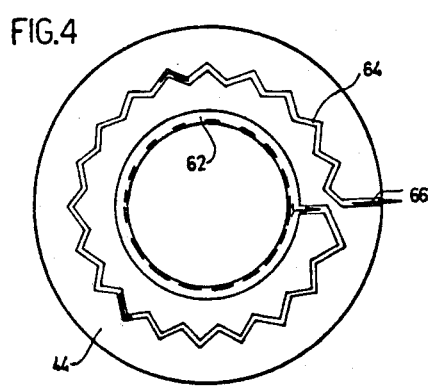
FIGS. 3 and 4 are views of the inside faces of the two-part body in the disassembled state.
Figure 3:
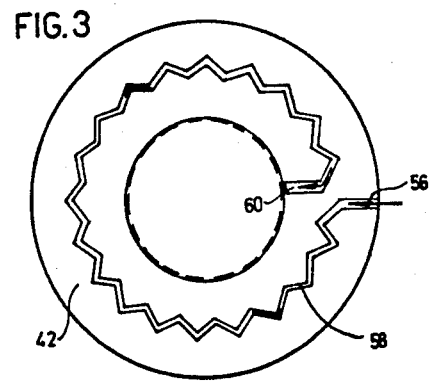

Referring now to FIGS. 2 to 4, there is shown another possible embodiment of constructing a control unit having a fluid flow via a passageway of a constant dimension made in a movable body resiliently suspended in a housing.

In FIG. 2 there is shown a two-part housing 36 and 36' having the peripheral edge of an annular diaphragm 38 clamped therebetween by means of a set of screws 40. To the inner edge of said annular diaphragm there is affixed a two-part threadedly interengagable movable body 42 and 44, thus, dividing the interior of the housing into two chambers, one associated with the inlet port 46 and the other with the outlet opening 48. The outlet port 50 is formed with a fitting 52 threadedly engaging the opening 48 of the housing part 36'. A coiled spring 54 is mounted in compression between the body part 44 and the housing-part 36' surrounding the fitting 52.

The exact structures of the two body-parts 42 and 44 will now be described to better advantage also with respect to FIGS. 3 and 4. As seen, the body-part 42 is provided with an inlet 56 leading into a tortuous or meandering passageway 58 including a plurality of tortuous or constituting a flow restriction for effecting head losses of the flow. The passageway 58 extends around the surface of the body-part and terminates adjacent to the inlet 56 with an oppositely directed outlet 60. The body-part 44 is formed with a circular channel 62 adapted to communicate with the outlet 60 when the two body-parts 42 and 44 are engaged. The channel 62 leads into a second tortuous or meandering passageway 64, similar to passageway 58 of body-part 42, which passageway 62 terminates with an outlet 66 leading into the chamber associated with the outlet port of the housing.

It should, however, be clear that instead of the shown tortuous or meandering type passageways 58 and 64, another type of flow restricting and flow-energy-wasting passageway, as for example, the labyrinth type passageway, could just the same be used. It is also envisioned that only one such passageway be used in either the body-part 42 or the body-part 44. Also, the design of the two-part body 42, 44 need not necessarily be such that the inner peripheral edge of the diaphragm 38 serves as a partition between the passageways, as shown, but alternatively, e.g., only one of the body-parts may be formed with such a flow restricting passageway while the movable body itself may be affixed onto the diaphragm by any other suitable means.

The operation of the fluid control unit according to this embodiment is similar to the operation of the unit according to the embodiment of FIG. 1 except for the fitting 52 which may be pre-adjusted with respect to the surface of the movable body to thereby pre-adjust the rate of flow without changing the spring force.

Finally, it will be evident to those skilled in the art that the invention is not limited to the details of the foregoing illustrative embodiments and that the present invention may be embodied in other specific forms without departing from the spirit or essential attributes thereof. It is, therefore, desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A fluid flow control unit adapted to be connected to a source of fluid under pressure, said unit comprising:
    a housing having an input port and an output port:
    a two-part body suspended in said housing by means of a diaphragm dividing said housing into an input chamber and an output chamber wherein said body is moveable in relation to said ports under the influence of the fluid pressure differential between said input chamber and said output chamber for variably restricting said output port under the displacement of said body toward said output port;
    a tortuous passageway including a plurality of turns, a radially extending portion and flow restricting means formed in at least one part of said body, said passageway passing through said body between non-linearly aligned inlet and outlet openings for fluid communication between said input and output chambers via said body, the dimensions of which passageway remain unchanged during operation; and
    resilient means for biasing said body toward said input port;
    whereby the flow of fluid through said output port is controlled at a constant rate by said movable body and resilient means despite variations in the fluid pressure at, at least, one of the ports.

2. The fluid flow control unit as claimed in claim 1 wherein said resilient means is a spring positioned between said body and said output port.

3. The fluid flow control unit as claimed in claim 1 wherein said output port is adapted to be adjustably displaced in relation to the housing portion bearing said output port, to vary the preset distance between said body and said output port.

4. The fluid flow control unit as claimed in claim 1 wherein said passageway is elongated.

5. The fluid flow control unit as claimed in claim 1 wherein said passageway is defined by channels formed in the two body parts.

* * * * *